(12) United States Patent
Blum et al.

(10) Patent No.: US 10,634,921 B2
(45) Date of Patent: Apr. 28, 2020

(54) SEE-THROUGH NEAR EYE OPTICAL DISPLAY

(71) Applicant: NewSight Reality, Inc., Roanoke, VA (US)

(72) Inventors: Ronald Blum, Roanoke, VA (US); Ami Gupta, Roanoke, VA (US); Igor Landau, Boulder, CO (US); Rick Morrison, Longmont, CO (US)

(73) Assignee: NewSight Reality, Inc., Roanoke, VA (US)

( * ) Notice: Subject to any disclaimer, the term of this patent is extended or adjusted under 35 U.S.C. 154(b) by 0 days.

(21) Appl. No.: 16/449,395

(22) Filed: Jun. 22, 2019

(65) Prior Publication Data

US 2019/0310481 A1 Oct. 10, 2019

Related U.S. Application Data (63) Continuation-in-part of application No. 16/289,623, filed on Feb. 28, 2019, which is a continuation-in-part
(Continued)

(51) Int. Cl.
*G09G 5/00* (2006.01)
*G02B 27/01* (2006.01)
(Continued)

(52) U.S. Cl.
CPC ..... *G02B 27/0172* (2013.01); *G02B 27/0179* (2013.01); *G06T 5/50* (2013.01);
(Continued)

(58) Field of Classification Search
CPC .................................................. G06T 19/006
See application file for complete search history.

(56) References Cited

U.S. PATENT DOCUMENTS 5,499,138 A 3/1996 Iba
6,349,001 B1 2/2002 Spitzer
(Continued)

FOREIGN PATENT DOCUMENTS

AU 2014400408 B2 1/2016
EP 1300716 A1 4/2003
(Continued)

OTHER PUBLICATIONS

Co-Pending International Application No. PCT/US2018/037561 filed Jun. 14, 2018, Search Report and Written Opinion of the International Searching Authority, dated Sep. 21, 2018, 13 pages.
(Continued)

*Primary Examiner* — Charles Tseng
(74) *Attorney, Agent, or Firm* — Woods Rogers PLC; Nathan A. Evans (57) ABSTRACT

According to embodiments of the invention, the invention is an augmented reality system that utilizes a near eye see-through optical module that comprises a transparent or semi-transparent see-through near eye display that is in optical alignment with a micro-lens array. According to certain embodiments of the invention, the augmented reality system comprises generating a virtual image as perceived by an eye of a wearer of the augmented reality system when looking at an object in space having a location in the real world that forms a real image. When utilizing a certain embodiment of the invention the virtual image changes, by way of example only, one or more of its shape, form, depth, 3D effect, location due to the eye or eyes shifting its (their) fixation position due to changing the location of different lighted pixels of the see-through near eye display(s). The invention further discloses various mechanisms to improve the quality of the virtual image and that of the augmented reality image while utilizing a near eye see-through optical
(Continued)

- THE HEIGHT (h) OF THE CONE IS APPROX. 2 MICRONS, $r_1$ IS THE PIXEL DIMENSION, $r_2 \sim 2 x r_1$
- LET US ASSUME $r_1$ TO BE 1 MICRON, THEN $r_2$ IS 2 MICRONS, i.e., THE EFFECTIVE DIAMETER OF THE PIXEL DOUBLES.
- THE PITCH INCREASES ACCORDINGLY.
- AREA OF THE PIXEL INCREASES BY 4X.
- THIS MEANS THAT A PIXEL OF DIAMETER $2\mu$, NOW BECOMES A PIXEL OF $4\mu$. PITCH SHOULD BE 6, MAKING THE FILL FACTOR TO BE 52%. TRANSPARENCY DROPS TO 43%.

module that comprises a see-through near eye display and distance separated and aligned micro-lens array.

7 Claims, 8 Drawing Sheets

Related U.S. Application Data of application No. 16/008,707, filed on Jun. 14, 2018, now Pat. No. 10,466,487, which is a continuation-in-part of application No. 15/994,595, filed on May 31, 2018.

(60) Provisional application No. 62/648,371, filed on Mar. 26, 2018, provisional application No. 62/638,789, filed on Mar. 5, 2018, provisional application No. 62/626,660, filed on Feb. 5, 2018, provisional application No. 62/624,201, filed on Jan. 31, 2018, provisional application No. 62/619,752, filed on Jan. 20, 2018, provisional application No. 62/613,313, filed on Jan. 3, 2018, provisional application No. 62/607,582, filed on Dec. 19, 2017, provisional application No. 62/542,168, filed on Aug. 7, 2017, provisional application No. 62/530,638, filed on Jul. 10, 2017, provisional application No. 62/522,866, filed on Jun. 21, 2017, provisional application No. 62/513,828, filed on Jun. 1, 2017, provisional application No. 62/546,473, filed on Aug. 16, 2017, provisional application No. 62/648,371, filed on Mar. 26, 2018, provisional application No. 62/638,789, filed on Mar. 5, 2018, provisional application No. 62/626,660, filed on Feb. 5, 2018, provisional application No. 62/624,201, filed on Jan. 31, 2018, provisional application No. 62/619,752, filed on Jan. 20, 2018, provisional application No. 62/613,313, filed on Jan. 3, 2018, provisional application No. 62/607,582, filed on Dec. 19, 2017, provisional application No. 62/546,473, filed on Aug. 16, 2017, provisional application No. 62/542,168, filed on Aug. 7, 2017, provisional application No. 62/522,866, filed on Jun. 21, 2017, provisional application No. 62/513,828, filed on Jun. 1, 2017, provisional application No. 62/694,222, filed on Jul. 5, 2018, provisional application No. 62/700,621, filed on Jul. 19, 2018, provisional application No. 62/700,632, filed on Jul. 19, 2018, provisional application No. 62/703,909, filed on Jul. 27, 2018, provisional application No. 62/703,911, filed on Jul. 27, 2018, provisional application No. 62/711,669, filed on Jul. 30, 2018, provisional application No. 62/717,424, filed on Aug. 10, 2018, provisional application No. 62/720,113, filed on Aug. 20, 2018, provisional application No. 62/720,116, filed on Aug. 21, 2018, provisional application No. 62/728,251, filed on Sep. 7, 2018, provisional application No. 62/732,039, filed on Sep. 17, 2018, provisional application No. 62/732,138, filed on Sep. 17, 2018, provisional application No. 62/739,904, filed on Oct. 2, 2018, provisional application No. 62/739,907, filed on Oct. 2, 2018, provisional application No. 62/752,739, filed on Oct. 30, 2018, provisional application No. 62/753,583, filed on Oct. 31, 2018, provisional application No. 62/754,929, filed on Nov. 2, 2018, provisional application No. 62/755,626, filed on Nov. 5, 2018, provisional application No. 62/755,630, filed on Nov. 5, 2018, provisional application No. 62/756,528, filed on Nov. 6, 2018, provisional application No. 62/756,542, filed on Nov. 6, 2018, provisional application No. 62/769,883, filed on Nov. 20, 2018, provisional application No. 62/770,210, filed on Nov. 21, 2018, provisional application No. 62/771,204, filed on Nov. 26, 2018, provisional application No. 62/774,362, filed on Dec. 3, 2018, provisional application No. 62/775,945, filed on Dec. 6, 2018, provisional application No. 62/778,960, filed on Dec. 13, 2018, provisional application No. 62/778,972, filed on Dec. 13, 2018, provisional application No. 62/780,391, filed on Dec. 17, 2018, provisional application No. 62/780,396, filed on Dec. 17, 2018, provisional application No. 62/783,596, filed on Dec. 21, 2018, provisional application No. 62/783,603, filed on Dec. 21, 2018, provisional application No. 62/785,284, filed on Dec. 27, 2018, provisional application No. 62/787,834, filed on Jan. 3, 2019, provisional application No. 62/788,275, filed on Jan. 4, 2019, provisional application No. 62/788,993, filed on Jan. 7, 2019, provisional application No. 62/788,995, filed on Jan. 7, 2019, provisional application No. 62/790,514, filed on Jan. 10, 2019, provisional application No. 62/790,516, filed on Jan. 10, 2019, provisional application No. 62/793,166, filed on Jan. 16, 2019, provisional application No. 62/794,779, filed on Jan. 21, 2019, provisional application No. 62/796,388, filed on Jan. 24, 2019, provisional application No. 62/796,410, filed on Jan. 24, 2019, provisional application No. 62/830,645, filed on Apr. 8, 2019, provisional application No. 62/847,427, filed on May 14, 2019, provisional application No. 62/848,636, filed on May 16, 2019.

(51) Int. Cl.
*G06T 5/50* (2006.01)
*G06T 11/00* (2006.01)
*G06T 19/00* (2011.01)

(52) U.S. Cl.
CPC ............ *G06T 11/00* (2013.01); *G06T 19/006* (2013.01); *G02B 2027/0187* (2013.01)

(56) References Cited

U.S. PATENT DOCUMENTS

| | | |
|---|---|---|
| 6,356,392 B1 | 3/2002 | Spitzer |
| 6,376,819 B1 * | 4/2002 | Neal .................. G01J 9/00 250/201.9 |
| 6,945,648 B2 | 9/2005 | Schindler et al. |
| 6,990,228 B1 | 1/2006 | Wiles et al. |
| 7,192,136 B2 | 3/2007 | Howell et al. |
| 7,195,353 B2 | 3/2007 | Blum et al. |
| 7,318,646 B2 | 1/2008 | Bernard et al. |
| 7,663,805 B2 | 2/2010 | Zaloum et al. |
| 7,667,783 B2 | 2/2010 | Hong et al. |
| 7,791,809 B2 | 9/2010 | Filipovich et al. |
| 8,177,361 B2 | 5/2012 | Sessner et al. |
| 8,508,830 B1 | 8/2013 | Wang |
| 8,582,209 B1 | 11/2013 | Amirparviz |
| 8,847,851 B2 | 9/2014 | Yamamoto |
| 8,970,962 B2 | 3/2015 | Filipovich et al. |
| 9,164,284 B2 | 10/2015 | Olsson et al. |
| 9,189,829 B2 | 11/2015 | Komori et al. |
| 9,285,592 B2 | 3/2016 | Olsson et al. |
| 9,507,153 B2 | 11/2016 | Filipovich et al. |
| 9,551,872 B1 | 1/2017 | Kress et al. |
| 9,552,676 B2 | 1/2017 | Wong et al. |

(56) References Cited

U.S. PATENT DOCUMENTS

| | | | |
|---|---|---|---|
| 9,557,152 | B2 | 1/2017 | Starner et al. |
| 9,584,705 | B2 | 2/2017 | Nordstrom et al. |
| 9,710,058 | B2 | 7/2017 | Gustafsson et al. |
| 9,720,257 | B2 | 8/2017 | Han et al. |
| 9,753,287 | B2 | 9/2017 | Chow et al. |
| 9,759,917 | B2 | 9/2017 | Osterhout et al. |
| 9,766,482 | B2 | 9/2017 | Cazalet et al. |
| D800,118 | S | 10/2017 | Xing et al. |
| 9,898,082 | B1 | 2/2018 | Greenwald |
| 9,983,408 | B2 | 5/2018 | De Matos Pereira Vieira |
| 10,162,182 | B2 | 12/2018 | Jepsen |
| 10,330,933 | B2 | 6/2019 | Jang et al. |
| 2006/0082768 | A1* | 4/2006 | Wilson .............. G01J 3/10 356/317 |
| 2006/0250574 | A1 | 11/2006 | Grand et al. |
| 2007/0215793 | A1* | 9/2007 | Gruhlke .............. G06F 3/0421 250/221 |
| 2009/0231722 | A1 | 9/2009 | Filipovich et al. |
| 2010/0164840 | A1 | 7/2010 | Yamamoto |
| 2010/0315720 | A1 | 12/2010 | Filipovich et al. |
| 2012/0320100 | A1 | 12/2012 | Machida et al. |
| 2013/0021226 | A1 | 1/2013 | Bell |
| 2013/0044042 | A1 | 2/2013 | Olsson et al. |
| 2013/0099091 | A1* | 4/2013 | Nemirovsky ......... H01L 31/024 250/206 |
| 2014/0022163 | A1 | 1/2014 | Olsson et al. |
| 2014/0062865 | A1* | 3/2014 | Fateh ................ G06T 11/206 345/156 |
| 2014/0118829 | A1 | 5/2014 | Ma et al. |
| 2014/0146394 | A1 | 5/2014 | Tout et al. |
| 2014/0168034 | A1* | 6/2014 | Luebke .............. G02B 27/017 345/8 |
| 2014/0267723 | A1* | 9/2014 | Davidson, Jr. ......... H04N 7/183 348/147 |
| 2014/0276686 | A1* | 9/2014 | Wu .................. A61B 18/22 606/9 |
| 2014/0327971 | A1 | 11/2014 | Filipovich et al. |
| 2015/0168730 | A1 | 6/2015 | Ashkenazi et al. |
| 2015/0169070 | A1 | 6/2015 | Harp et al. |
| 2015/0205132 | A1* | 7/2015 | Osterhout ........ G02B 27/0172 345/633 |
| 2015/0235445 | A1* | 8/2015 | Schowengerdt ......... G02F 1/29 345/611 |
| 2015/0268415 | A1* | 9/2015 | Schowengerdt ......... G02B 6/08 385/4 |
| 2015/0293358 | A1 | 10/2015 | de Matos Pereira Vieira et al. |
| 2015/0357315 | A1* | 12/2015 | Oraw ................ H01L 25/0753 315/294 |
| 2016/0048018 | A1 | 2/2016 | De Matos Pereira Vieira |
| 2016/0252728 | A1 | 9/2016 | Mack et al. |
| 2016/0327798 | A1* | 11/2016 | Xiao ................ G02B 3/0006 |
| 2016/0337625 | A1* | 11/2016 | Nakamura ........... H04N 9/3108 |
| 2016/0379606 | A1 | 12/2016 | Kollin et al. |
| 2017/0028299 | A1 | 2/2017 | The et al. |
| 2017/0031435 | A1 | 2/2017 | Raffle et al. |
| 2017/0038590 | A1 | 2/2017 | Jepsen |
| 2017/0039960 | A1 | 2/2017 | Jepsen |
| 2017/0052802 | A1 | 2/2017 | Ko et al. |
| 2017/0090557 | A1 | 3/2017 | Raffle et al. |
| 2017/0122725 | A1* | 5/2017 | Yeoh .................. G02B 27/01 |
| 2017/0131545 | A1 | 5/2017 | Wall et al. |
| 2017/0131764 | A1 | 5/2017 | Bognar et al. |
| 2017/0140701 | A1* | 5/2017 | Ogonowsky ............ G09G 3/32 |
| 2017/0147034 | A1 | 5/2017 | Lanman et al. |
| 2017/0153454 | A1 | 6/2017 | Callier et al. |
| 2017/0176777 | A1 | 6/2017 | Blum et al. |
| 2017/0200296 | A1 | 7/2017 | Jones et al. |
| 2017/0227779 | A1 | 8/2017 | Kato et al. |
| 2017/0229095 | A1 | 8/2017 | Raffle et al. |
| 2017/0235161 | A1 | 8/2017 | Hilkes et al. |
| 2017/0243371 | A1 | 8/2017 | Jurgenson et al. |
| 2017/0249862 | A1 | 8/2017 | Border |
| 2017/0256029 | A1 | 9/2017 | Shams et al. |
| 2017/0276963 | A1* | 9/2017 | Brennan ............ G02B 27/0075 |
| 2017/0285347 | A1 | 10/2017 | Cai et al. |
| 2017/0293148 | A1 | 10/2017 | Park et al. |
| 2018/0024366 | A1 | 1/2018 | Ma et al. |
| 2018/0045964 | A1 | 2/2018 | Jones et al. |
| 2018/0130226 | A1* | 5/2018 | Meess ................ G06T 7/50 |
| 2019/0057957 | A1* | 2/2019 | Xie .................. H01L 25/167 |
| 2019/0094803 | A1* | 3/2019 | Futterer ............. G03H 1/0402 |

FOREIGN PATENT DOCUMENTS

| | | |
|---|---|---|
| FR | 20020008969 B1 | 10/2004 |
| JP | 2017212475 A | 11/2017 |
| WO | 2008084751 A1 | 7/2008 |
| WO | 2010105201 A1 | 9/2010 |
| WO | 2013025672 A2 | 2/2013 |
| WO | 2013025672 A3 | 2/2013 |
| WO | 2013036888 A2 | 3/2013 |
| WO | 2013025672 A3 | 5/2013 |
| WO | 2016004998 A1 | 1/2016 |
| WO | 2016135727 A1 | 9/2016 |
| WO | 2017151872 A1 | 9/2017 |
| WO | 2017169345 A1 | 10/2017 |
| WO | 2017171157 A1 | 10/2017 |
| WO | 20180001917 A1 | 1/2018 |
| WO | 2018217253 A1 | 11/2018 |

OTHER PUBLICATIONS

Co-Pending International Application No. PCT/US2018/035424 filed May 31, 2018, Search Report and Written Opinion of the International Searching Authority, dated Aug. 31, 2018, 16 pages.

Co-Pending International Application No. PCT/US2019/020168 filed Feb. 28, 2019, Search Report and Written Opinion of the International Searching Authority, dated May 23, 2019, 15 pages.

CMOS Image with 1024 SPADs and TDCs for single-photon timing and 3d time-of-flight article, IEEE Journal of Selected Topics in Quantum Electronics, vol. 20, No. 6, Nov./Dec. 2014.

PCT Search Report and Written Opinion (13 Pages), for PCT/US 19/38624, dated Dec. 3, 2019.

* cited by examiner

CHART SHOWING PIXEL SIZE, PITCH, FILL FACTOR AND TRANSPARENCY

| PIXEL DIMENSIONS | PITCH | FILL FACTOR | TRANSPARENCY |
|---|---|---|---|
| 1μ X 1μ | 2μ | 25% | 67% |
| 1μ X 1μ | 3μ | 11% | 80% |
| 2μ X 2μ | 3μ | 44% | 50% |
| 2μ X 2μ | 5μ | 16% | 75% |
| 2μ X 2μ | 7μ | 8% | 83% |
| 2μ DIAMETER | 4μ | 35% | 58% |

ASSUMES 90% TRANSPARENCY OF UNFILLED AREAS
(BETWEEN PIXELS OR PIXEL PATCHES)

FIG. 6

CHART SHOWING PIXEL SIZE, IMAGE MAGNIFICATION, RETINAL SIZE AND RESOLUTION OF RETINA

| PIXEL SIZE | IMAGE MAGNIFICATION | RETINAL IMAGE SIZE | RESOLUTION AT RETINA (ARC MIN) |
|---|---|---|---|
| 1μ | 6X | 6μ | 1.0 |
| 1μ | 8X | 8μ | 1.5 |
| 2μ | 6X | 12μ | 2.0 |
| 2μ | 8X | 16μ | 3.0 |
| 5μ | 6X | 30μ | 6.0 |

SEE-THROUGH NEAR EYE OPTICAL DISPLAY

CROSS-REFERENCE TO RELATED APPLICATIONS

The present application relies on the disclosures of and claims priority to and the benefit of the filing dates of U.S. patent application Ser. No. 16/289,623 filed Feb. 28, 2019, which claims priority to U.S. patent application Ser. No. 16/008,707 filed Jun. 14, 2018, which claims priority to U.S. application Ser. No. 15/994,595 filed May 31, 2018, as well as the following U.S. Provisional Patent Applications, with filing dates and titles, the disclosures of which are hereby incorporated by reference herein in their entireties.
62/694,222 filed on Jul. 5, 2018: Optimizing Micro-Lens Array for use with TOLED for Augmented Reality or Mixed Reality
62/700,621 filed on Jul. 19, 2018: LC Switchable See-Through TOLED Optical Combiner for Augmented Reality or Mixed Reality
62/700,632 filed on Jul. 19, 2018: Improved See-Through TOLED Optical Combiner for Augmented Reality or Mixed Reality
62/703,909 filed on Jul. 27, 2018: Near Eye See-Through Display Optical Combiner for Augmented Reality or Mixed Reality
62/703,911 filed on Jul. 27, 2018: LC Switchable Near Eye See-Through Display Combiner for Augmented Reality or Mixed Reality
62/711,669 filed on Jul. 30, 2018: Near Eye See-Through Display Optical Combiner Comprising LC Switchable Lensing System for Augmented Reality or Mixed Reality
62/717,424 filed on Aug. 10, 2018: Near Eye See-Through Display Optical Combiner for Augmented Reality or Mixed Reality and HMD
62/720,113 filed on Aug. 20, 2018: Sparsely Populated Near Eye Display Optical Combiner and Static Micro-Optic Array for AR and MR
62/720,116 filed on Aug. 21, 2018: Sparsely Populated Near Eye Display Optical Combiner for AR and MR
62/728,251 filed on Sep. 7, 2018: Figures For Eyewear Comprising a See-Through Eye Display Optical Combiner
62/732,039 filed on Sep. 17, 2018: Eyewear Comprising a Dynamic See-Through Near Eye Display Optical Combiner
62/732,138 filed on Sep. 17, 2018: Binocular See-Through Near Eye Display Optical Combiner
62/739,904 filed on Oct. 2, 2018: See-Through Near Eye Display Optical Combiner Module and Attachment Mean
62/739,907 filed on Oct. 2, 2018: Dynamic See-Through Near Eye Display Optical Combiner Module and Attachment Mean
62/752,739 filed on Oct. 30, 2018: Photonic Optical Combiner Module
62/753,583 filed on Oct. 31, 2018: Improved Photonic Optical Combiner Module
62/754,929 filed on Nov. 2, 2018: Further Improved Photonic Optical Combiner Module
62/755,626 filed on Nov. 5, 2018: Near Eye Display See Through Optical Combiner
62/755,630 filed on Nov. 5, 2018: Static See Through Near Eye Display Optical Combiner
62/756,528 filed on Nov. 6, 2018: Detachable Attachable Two Section Frame Front for XR
62/756,542 filed on Nov. 6, 2018: Spectacle Lens in Optical Communication with See-Through Near Eye Display Optical Combiner
62/769,883 filed on Nov. 20, 2018: Enhanced Near Eye Display Optical Combiner Module
62/770,210 filed on Nov. 21, 2018: Further Enhanced Near Eye Display Optical Combiner Module
62/771,204 filed on Nov. 26, 2018: Adjustable Virtual Image Near Eye Display Optical Combiner Module
62/774,362 filed on Dec. 3, 2018: Integrated Lens with NSR Optical Combiner
62/775,945 filed on Dec. 6, 2018: See-Through Near Eye Display Optical Combiner Module With Front Light Blocker
62/778,960 filed on Dec. 13, 2018: See-Through Near Eye Display Having Opaque Pixel Patches
62/778,972 filed on Dec. 13, 2018: Improved See-Through Near Eye Display Optical Combiner Module With Front Light Blocker
62/780,391 filed on Dec. 17, 2018: See-Through Modulated Near Eye Display With Light Emission Away From The Eye of a Wearer Reduced or Blocked
62/780,396 filed on Dec. 17, 2018: Modulated MLA and/or Near Eye Display Having Light Emission Away From The Eye of a Wearer Reduced or Blocked
62/783,596 filed on Dec. 21, 2018: Modulated MLA and/or Near Eye Display With Light Emission Away From Eye of User
62/783,603 filed on Dec. 21, 2018: Improved Modulated MLA and/or Near Eye Display With Light Emission Away From Eye of User
62/785,284 filed on Dec. 27, 2018: Advanced See-Through Modulated Near Eye Display With Outward Light Emission Reduced or Blocked
62/787,834 filed on Jan. 3, 2018: Advanced Integrated Lens with NSR Optical Combiner
62/788,275 filed on Jan. 4, 2019: Advanced See-Through Near Eye Display Optical Combiner
62/788,993 filed on Jan. 7, 2019: Fabricating an Integrated Lens with See-Through Near Eye Display Optical Combiner
62/788,995 filed on Jan. 7, 2019: Further Advanced See-Through Near Eye Display Optical Combiner
62/790,514 filed on Jan. 10, 2019: Further, Further Advanced See-Through Near Eye Display Optical Combiner
62/790,516 filed on Jan. 10, 2019: Advanced, Advanced See-Through Near Eye Display Optical Combiner
62/793,166 filed on Jan. 16, 2019: Near Eye Display See-Through Module for XR
62/794,779 filed on Jan. 21, 2019: Near Eye Module Invention Summary
62/796,388 filed on Jan. 24, 2019: Transparent Near Eye Display Invention Summary
62/796,410 filed on Jan. 24, 2019: Transparent Near Eye Module Summary
62/830,645 filed on Apr. 8, 2019: Enhancement of Virtual Image
62/847,427 filed May 14, 2019: Enhancing the AR Image
62/848,636 filed May 16, 2019: Further Enhanced AR Image

BACKGROUND OF THE INVENTION

Field of the Invention

The invention relates to an augmented reality system that utilizes a transparent or semi-transparent see-through near eye display that is in optical alignment with a micro-lens array. The transparent or semi-transparent see-through near eye display must permit light rays from the distant world to pass through as well as the micro-lens array. Light rays from said display pass through the micro-lens array, then through an eye glass lens providing refractive correction for that specific gaze direction before entering the pupil of the eye. In static embodiments where the micro-lenses are static, light rays from the real-world pass through the transparent or semi-transparent portions of the display as well as the micro-lens array before being incident on the eyeglass lens in order to form a real image. The quality of the virtual image can be affected by multiple factors, such as by way of example only, by aberrations of the micro-lenses in the micro-lens array, number of lit pixels producing the virtual image, the brightness of the pixels that produce the virtual image, and/or the magnification produced by the AR system of the image on the retina. Thus, there is always a need for ways to improve the quality of the virtual image. In dynamic embodiments the micro-lenses and/or the micro-lens array can be switched between two optical powers (by way of example only, no optical power or optical) in order to provide an optimal combination of a virtual image and a real image (thus creating augmented reality). In certain cases, the quality of the real image and the quality of the virtual image will affect the quality of the augmented reality being perceived by the eye of a user. In certain dynamic embodiments the switchable micro-lens array is electrically connected to the see-through near eye display. Thus, there is a need to enhance the virtual image using design techniques for enhancing, such as by way of incorporating such techniques within the design of the near eye display and the micro-lens array.

Description of Related Art

Today's augmented and/or mixed reality systems in most cases have a large form factor and are clunky, heavy, power hungry, fashion limited and expensive. For these systems to have an increased level of adoption a major transformational technology change is needed. The innovation disclosed herein teaches such a transformational breakthrough for the AR (augmented reality) & MR (mixed reality) eyewear/headwear systems.

SUMMARY OF THE INVENTION

According to embodiments of the invention, the invention is an augmented reality system that utilizes a near eye see-through optical module that comprises a transparent or semi-transparent see-through near eye display that is in optical alignment with a micro-lens array. According to certain embodiments of the invention, the augmented reality system comprises generating a virtual image as perceived by an eye of a wearer of the augmented reality system when looking at an object in space having a location in the real world that forms a real image. When utilizing a certain embodiment of the invention the virtual image changes, by way of example only, one or more of its shape, form, depth, 3D effect, location due to the eye or eyes shifting its (their) fixation position due to changing the location of different lighted pixels of the see-through near eye display (s). It is important to note that unlike other AR systems whereby "first" an eye tracker locates the eye of a wearer and then the appropriate pixels are illuminated (lit) for such a location of the eye of a wearer, with this embodiment the opposite occurs, in aspects. "First" a pixel or plurality of pixels is/are illuminated (lit) and the fixation point of the eye(s) moves to see the lit pixel or pixels. Thus, the eye or eyes is/are a slave of the near eye display. The invention further discloses various ways to improve the quality of the virtual image and that of the augmented reality image while utilizing a near eye see-through optical module that comprises a see-through near eye display and distance separated and aligned micro-lens array. An embodiment for generating such an improvement can be used for the inventive near eye see-through optical module with or without an eye tracker.

BRIEF DESCRIPTION OF THE DRAWINGS

The accompanying drawings illustrate certain aspects of embodiments of the present invention and should not be used to limit the invention. Together with the written description the drawings explain certain principles of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

According to embodiments, the invention teaches various ways to improve the quality of the AR image provided by the inventive see-through near eye optical module described herein. The invention relates to a see-through near eye display that is in optical alignment with a micro-lens array. The see-through near eye display permits light rays from the distant world to pass through as well as the micro-lens array. Light rays from said display pass through the micro-lens array, then through an eye glass optic providing refractive correction for that specific gaze direction before entering the pupil of the eye without forming an image.

Turning to the figures, as shown in FIGS. 1-4, the resolution of the virtual image formed on the retina can be improved by dithering the lenslets (micro-lenses) of the micro-lens array in the x, y plane. The layout of pixels or pixel patches can be dithered. In addition, the MLA (micro-lens array) may also be dithered; in other words, varied in their x, y location by an amount smaller than their pitch. The dithering of pixels or pixel patches can improve virtual image quality. The dithering of the pixels or pixel patches can be dithered within the range of 5% to 20% of pitch. The dithering of lenslets/micro-lenses can further improve virtual image quality. Dithering of lenslets/micro-lenses can be within the range of 5% and 50% of their pitch, such as from 5% to 10%, 10% to 15%, 15% to 20%, and so on.

In embodiments, dithering overlays shifted or said another way partially offsetting (misaligned) pixelated image sets are specifically designed this way for the objective to improve overall performance. Increased resolution is accomplished by creating a slight offset of overlapping images on the retina that are generated by a plurality of pixel patches. This can be accomplished by shifting the position of either the pixel patch or the MLA (micro-lens array) lenslet (micro-lens). Dithering can be applied when the light is collected from multiple lenslets (micro-lenses) or optical channels simultaneously and accepted through the eye's pupil. Configuration can be such that multiple pixel patches have their light imaged into or onto a common retinal area.

Dithering can be used with the pixel array of a sparsely populated near eye display to increase the resolution of the virtual image. Dithering can be provided by slightly modifying the pitch of the lenslets (micro-lenses of an MLA). Dithering can be provided by slightly modifying the pitch of the pixels or pixel patches of a near eye display.

According to embodiments, the invention taught herein describes an augmented reality system, wherein the augmented reality system comprises a micro-lens array and a see-through near eye display, wherein the real image is formed from light rays from the real world that pass through the near eye display and that of the micro-lens array largely unaltered (meaning not refracted by the micro-lenses) and are seen by an eye of a user, wherein the virtual image is formed from light rays generated by the see through near eye display that pass through micro-lenses of a micro-lens array that are seen by the eye of a user and wherein the pixels or pixel patches of the see-though near eye display or micro-lenses of the micro-lens array are dithered. The pixels can be dithered within the range of 5% to 50% of their pitch. The pixels patches can be dithered within the range of 5% to 20% of their pitch. The micro-lenses can be dithered within the range of 5% to 50% of their pitch. The augmented reality system can comprise pixels or pixel patches and micro-lenses of the micro-lens array that are dithered. By dithering the pixels, pixel patches, micro-lenses or a combination thereof it is possible to enhance the virtual image as seen by the eye of a user of the AR System.

The invention utilizes the eye being a slave to the see-through near eye display. In aspects, the eye does not first move to see additional detail of a virtual image, but rather changing illumination from the display drives the eye to see a changing virtual image. With the invention, the macula and/or fovea is completely or partially filled by the virtual image. With the invention, to see a change in the virtual image the display may display different content or image forms that completely or partially fill the macula and/or fovea of the eye seeing augmented reality. In aspects, the eye is not "moving" to see a different tiled area of the virtual image that is displayed by the near eye display. Rather, with the invention, the macula and/or the fovea is completely or partially filled with the virtual image to see more detail or a different part of a virtual image. In aspects, the displayed content may change but the eye may stay mostly or partially or completely steady except for involuntary eye movements. In embodiments, a plurality of pixel patches generates a retinal image that partially or completely overlaps, thus increasing brightness and increasing contrast of the virtual image. In aspects, the display, specifically the activated pixels in the display at any point of time may control the gaze direction and alter the real image corresponding to the direction of gaze. In a binocular device, for example, the positioning of the virtual image may be rendered disconjugate to control vergence and image magnification of the real image provided by the eyeglass optics. Such a binocular embodiment provides an alignment between vergence and image magnification as well as better depth perception within the virtual image.

The manner (method) in which adjacent retinal images generated by adjacent pixel patches have their borders aligned adjacent to one another may be accomplished by way of taking into consideration the image magnification on the retina of the AR system and the distance separation of the two adjacent pixel patches. By adjusting either or both the magnification and/or distance separation of the two adjacent pixel patches it is possible to align the two adjacent representative retinal images. In addition, it is possible to remove pixels of one or more pixel patch(es) that cause overlap with an adjacent retinal image or images such to provide for a border between two adjacent retinal images.

In another embodiment, the eye of a wearer moves to where the virtual image is generated by the pixel or pixel patches of the near eye display. This is, in ways, unlike eye tracking where the eye looks first then the near eye display lights up pixels due to identifying the location of the eye first. According to the current invention, the virtual image can be moved or relocated along the X, Y, Z axes due to the pixels or pixel patches being lighted on the near eye display and the eye reacting/fixating to the lighted pixels or pixels as opposed to the way AR systems work that use eye tracking. In an embodiment, location of the virtual image when combined with the real image is achieved by locating the target location of the real image by combining information from a GPS sensor with an accelerometer that tracks heads movement.

In an embodiment of the invention, a sealed optical module(s) comprise a sparsely populated, see-through near eye display having a transparency of 70% or higher that is distance separated from that of a sparsely populated micro-lens array. The sealed optical module can be curved to the shape of the front base curve of an eyeglass lens. Both the see-through near eye display and the micro-lens array can be curved. The see-though near eye display and the micro-lens array may be distance separated by a gap. The gap can be that of air or filled in by a material. In certain embodiments the curve is in one direction. In certain other embodiments the curve is in two or more directions. The pixels of the see-through near eye display can be, by way of example only, micro-LEDs (iLEDs). The size of the pixels may be 5 microns or less, preferably 2 microns or less. In certain embodiments the pixel fill factor can be 20% or less. In certain other embodiments the pixel fill factor can be 10% or less. The micro-lens fill factor of the micro-lens array can be 40% or less. In certain other embodiments the micro-lens fill factor is 30% or less. The size of a micro-lens of the micro-lens array can be 400 microns-600 microns, by way of example. One or more micro-LEDs can be optically aligned with 1 micro-lens or more than one micro-lens. Thus, a plurality of micro-LEDs can be optically aligned with a plurality of micro-lenses. In certain embodiments a patch of micro-LEDs can be optically aligned with a micro-lens or a micro-lens array. In certain embodiments multiple patches of micro-LEDs can provide overlapping retinal images whereby the overlap is 100%, or less. In certain other embodiments the size of the micro-lenses of the micro-lens array can range between 10 microns and 100 microns. In this embodiment, diffraction caused by the micro-lenses may be eliminated by creating a Bessel beam that travels diffraction free, at least for short distances. In certain embodiments the micro-lenses are aspheric. In certain embodiments the micro-lenses are dithered. The see-through near eye display can be of an active matrix display. The see-through near eye display can be of a passive matrix display.

In embodiments, the pixel pitch can be about 5 microns for a pixel size of 3.5 microns. In embodiments, the pixel pitch can be 3 microns for a pixel size of 1-2 microns. The micro-lens array can be that of a static micro-lens array or that of a dynamic micro-lens array. When the micro-lens array is dynamic the switching on and off of the micro-lens array can be synchronized with the switching on and off of certain pixels or pixel patches of the see-through near eye display. In certain embodiment the micro-LEDs (iLEDs) are pulsed or modulated. In aspects, the minimum modulation frequency can be 30 Hz-60 Hz (or higher). In aspects, the duty cycle can be 1% or higher. In certain embodiments the duty cycle may be between 1% and 25%. In other embodiments the duty cycle may be between 25% and 50%. In certain embodiments the modulation for the micro-LEDs (iLEDs) may be such that the user's perception of the virtual image brightness is commensurate to that of the user's perception of the brightness of the real-world ambient light. In certain other embodiments the modulation for the micro-LEDs (iLEDs) may be such that the user's perception of the virtual image brightness is higher than that of the user's perception of the brightness of the real-world ambient light. In certain embodiments, the see-through near eye display can be monochromatic. In other embodiments the see-through near eye display can be that of RGB or full color. The back side of the micro-LEDs (iLEDs) furthest away from the eye of the user can be opaque or near-opaque. This back side can be that of the substrate or that of an opaque or near-opaque element that is attached to either the substrate of the micro-LED (iLED). The area between the micro-LEDs (iLEDs) can be transparent or semi-transparent.

In a certain embodiment using an iLED (micro-LED) see-through near eye display, the diameter of the lenslet (micro-lens) to maintain diffraction at a low level may be about 400-650 microns (about 0.4-0.6 mm). In aspects, the pixel pitch can be about 5 microns in a monochrome display, with a pixel size of 3.5 microns. In aspects, it can be 3 microns for a pixel size of 1-2 microns. This means that there will be about 64×64 pixels or more per patch and will be refracted through a single lens-let (micro-lens). Given that the size of the pupil is around 4 mm, the pupil will be partially or fully covered by about 8×8 lenslets, covering a field of view of around 12.5 deg×12.5 deg, full macular vision. This assumes little to no sparsity and can be used if the substrate is transparent and the pixels are see-through, for example. For a fill factor of around 2%, the number of pixels can be reduced per lenslet (micro-lens) from 64×64 to 9×9, or 32×32 for a fill factor of 25%, by way of example. The light distribution of an iLED (micro-LED) can be formed in a cone projecting to the eye of the wearer. This can be accomplished, by way of example only, by creating a recessed well in the surface of the transparent substrate and positioning the iLED (micro-LED) in or within the recessed well. In other embodiments this can be accomplished by utilizing an aperture shield around an iLED (micro-LED) and located between the iLED (micro-LED) and the micro-lens of the micro-lens array, for example.

A certain embodiment is that of an AR system, wherein the real image is generated by the eye looking at a stationary location in space, while the virtual image changes due to changing the location of the activated pixels of the see-through near eye display while the eye remains stationary. Another embodiment is that of an AR system, wherein the location of the virtual image is altered by changing the location of different activated pixels causing the eye to move to fixate on these different activated pixels, as opposed tracking the direction of gaze using a gaze tracker, then projecting the virtual image at a location to match the direction of gaze.

In still another embodiment of an AR system, movement of the virtual image is achieved by altering the location of activated pixels causing the eye to move to fixate on these different activated pixels, as opposed to activated pixels being generated in relation to the location of where the eye is looking. In still another embodiment, the invention describes an AR system, wherein the brightness is increased by overlapping images on the retina generated by a plurality of pixel patches that generate such overlap.

The overlapping retinal images may have an overlap between 90% to 100% overlapping images, in examples. The overlapping retinal images have an overlap of 100%, in other examples. An additional embodiment is that of an AR system wherein the virtual image is enhanced by way of dithering the overlap of the retinal images by way of pixel patches. And in another embodiment, an AR system is taught wherein the virtual image is enhanced by way of dithering the overlap of the retinal images by way of micro-lenses.

Figure 1:
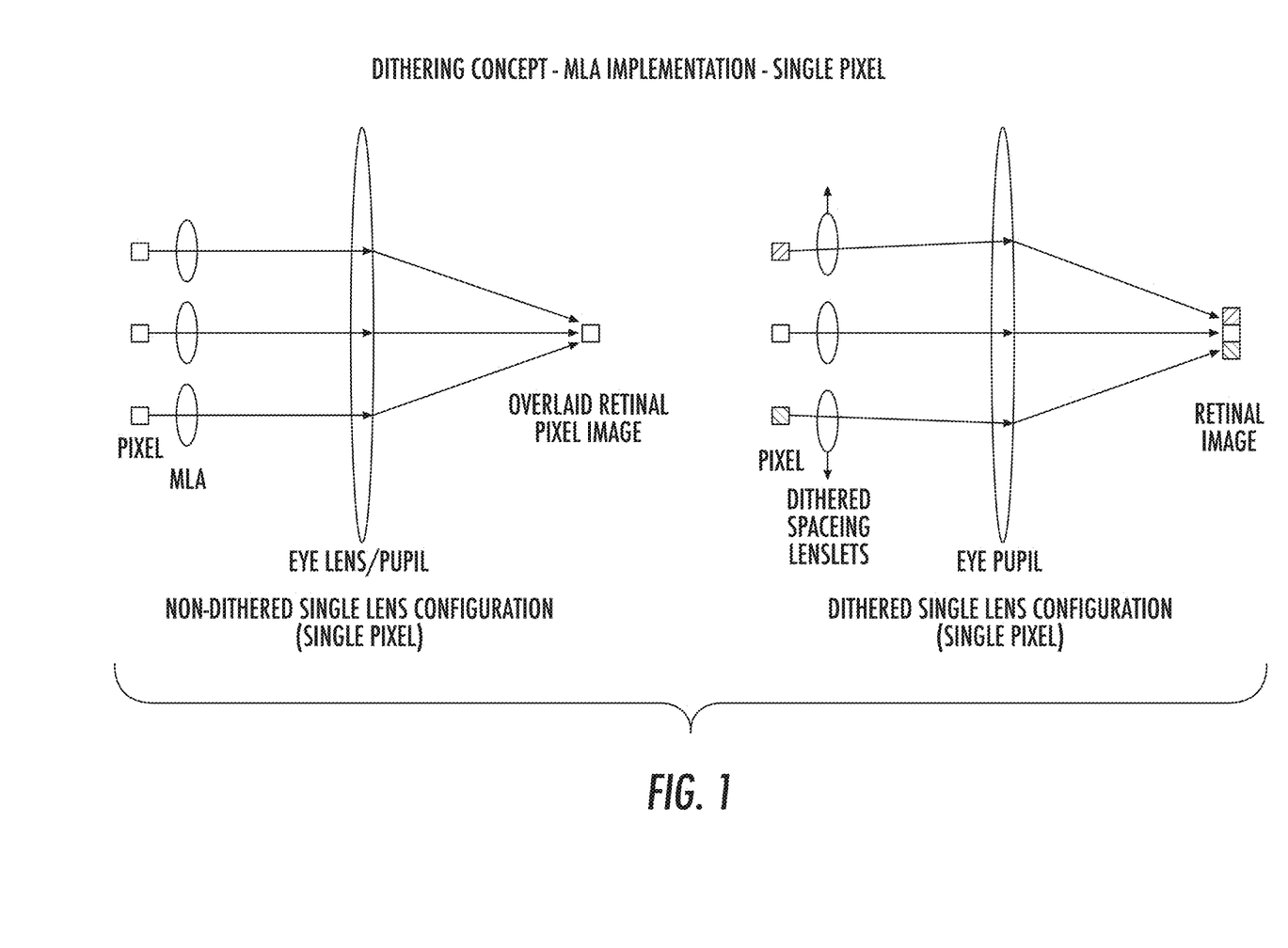
FIG. 1 is a schematic diagram showing a dithering concept according to an embodiment.
Figure 2:
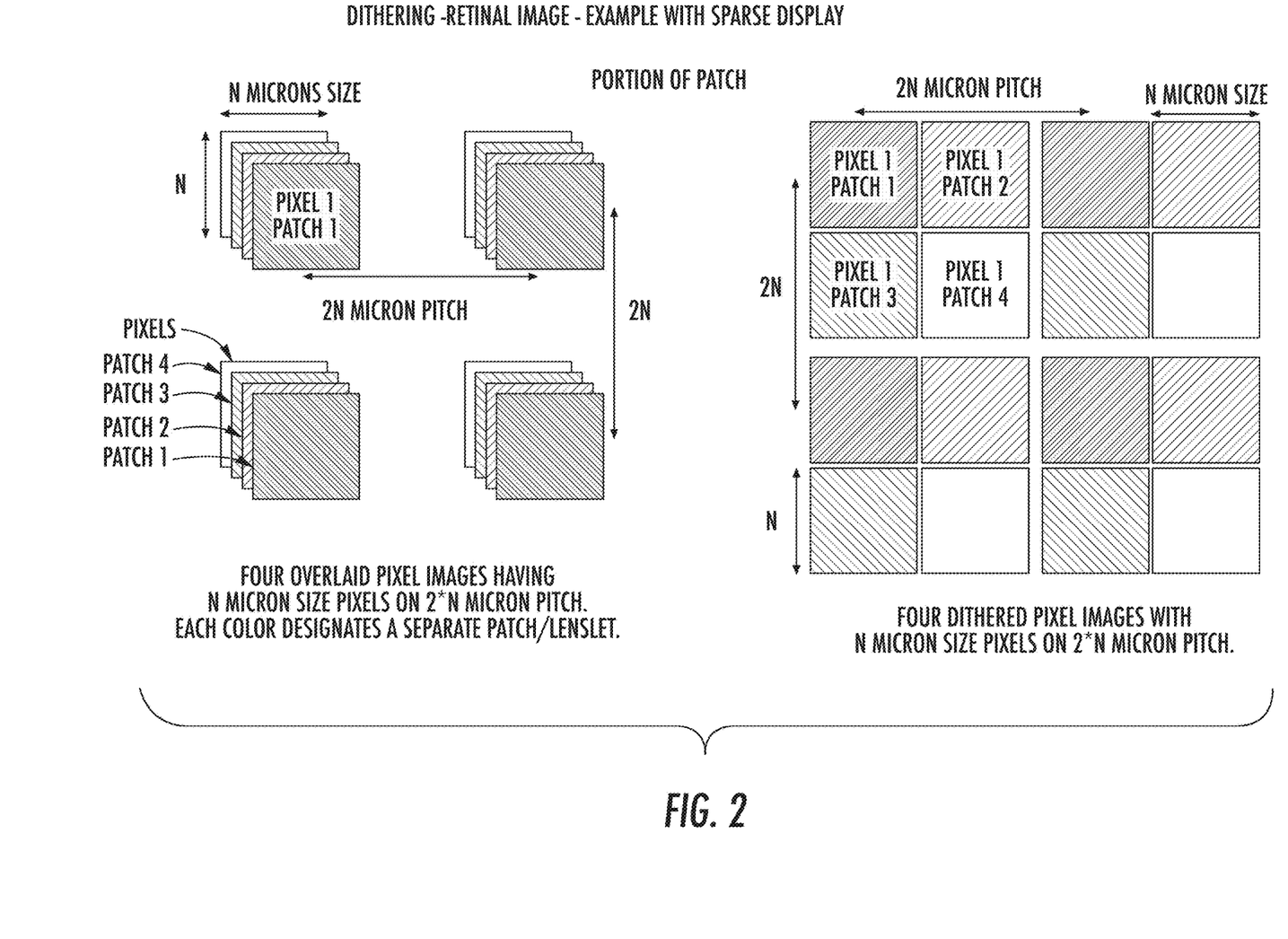
FIG. 2 is a schematic diagram showing a dithering concept according to an embodiment.
Figure 3:
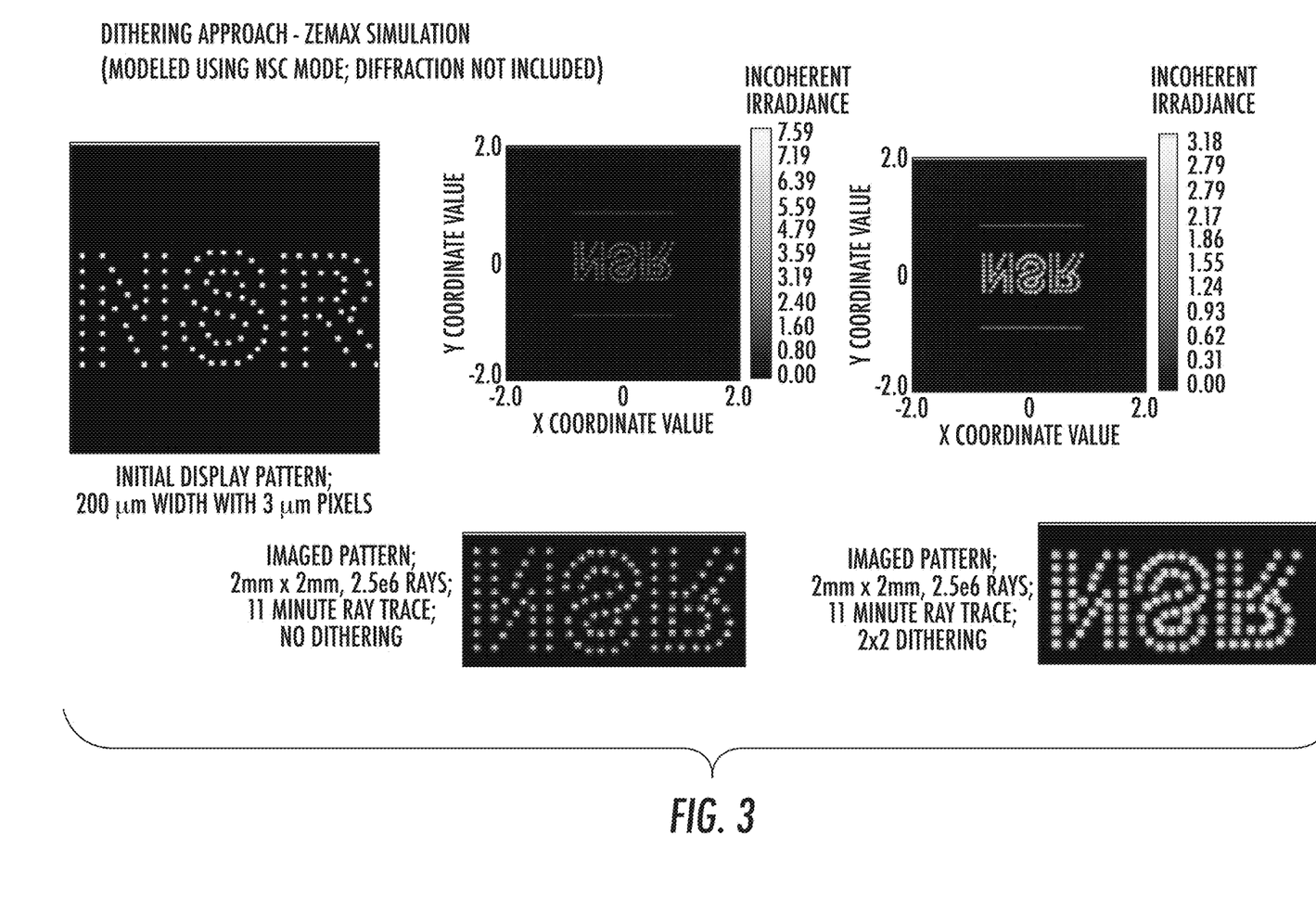
FIG. 3 is a schematic diagram showing a dithering concept according to an embodiment.
Figure 4:
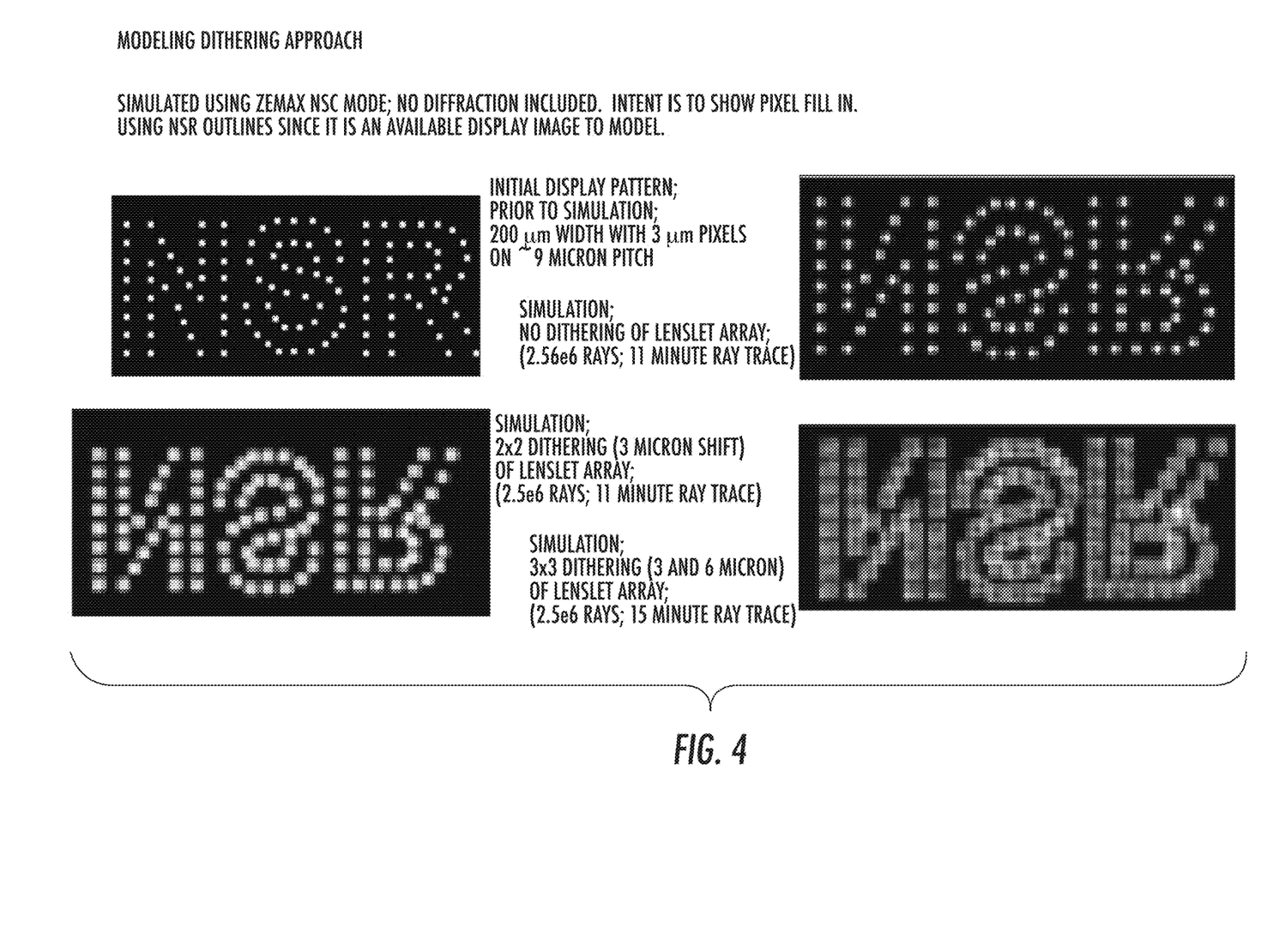
FIG. 4 is a schematic diagram showing a dithering concept according to an embodiment.
Figure 5:
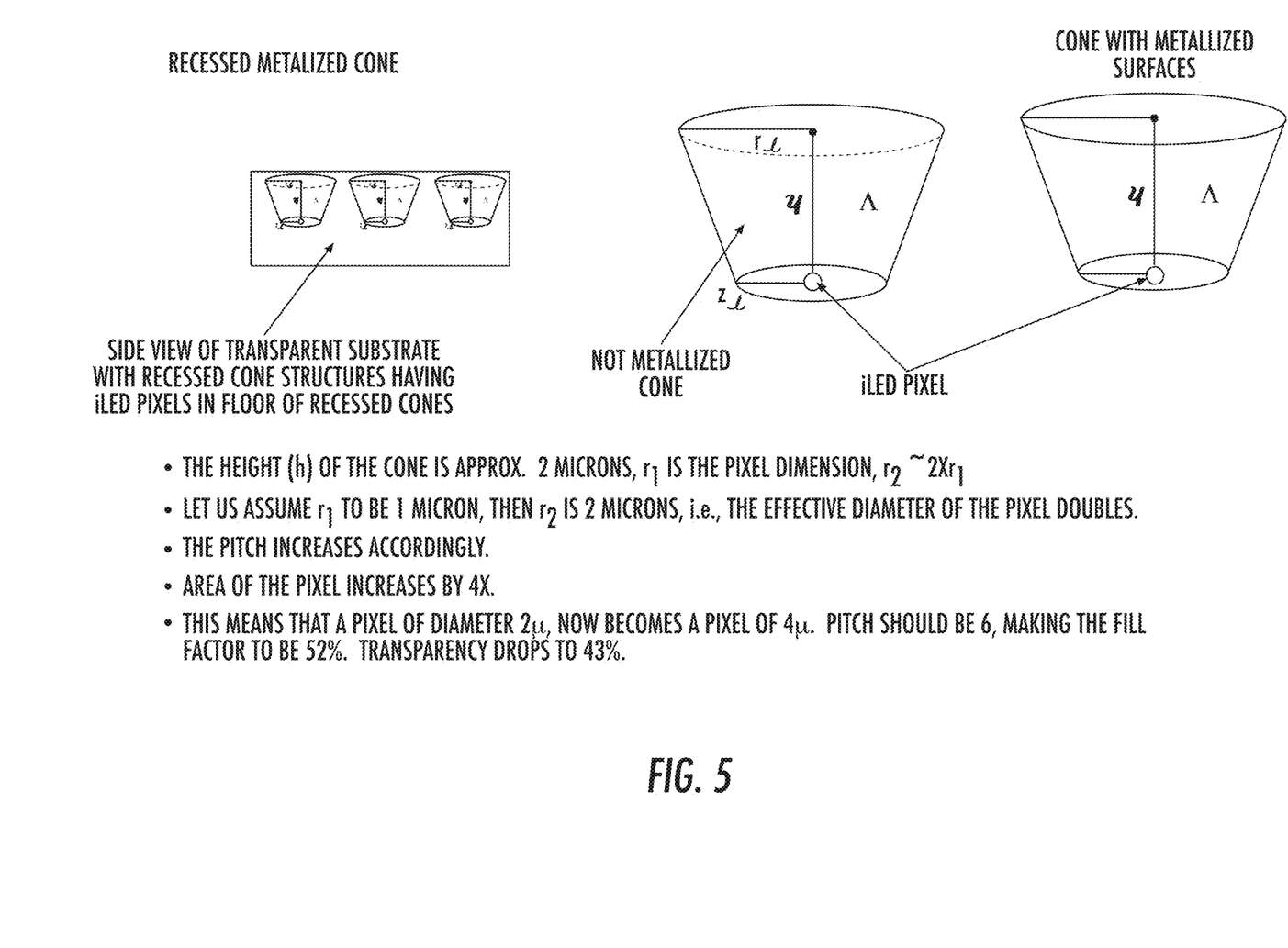
FIG. 5 is a schematic diagram showing a recessed metallized cone according to an embodiment.
Figure 6:
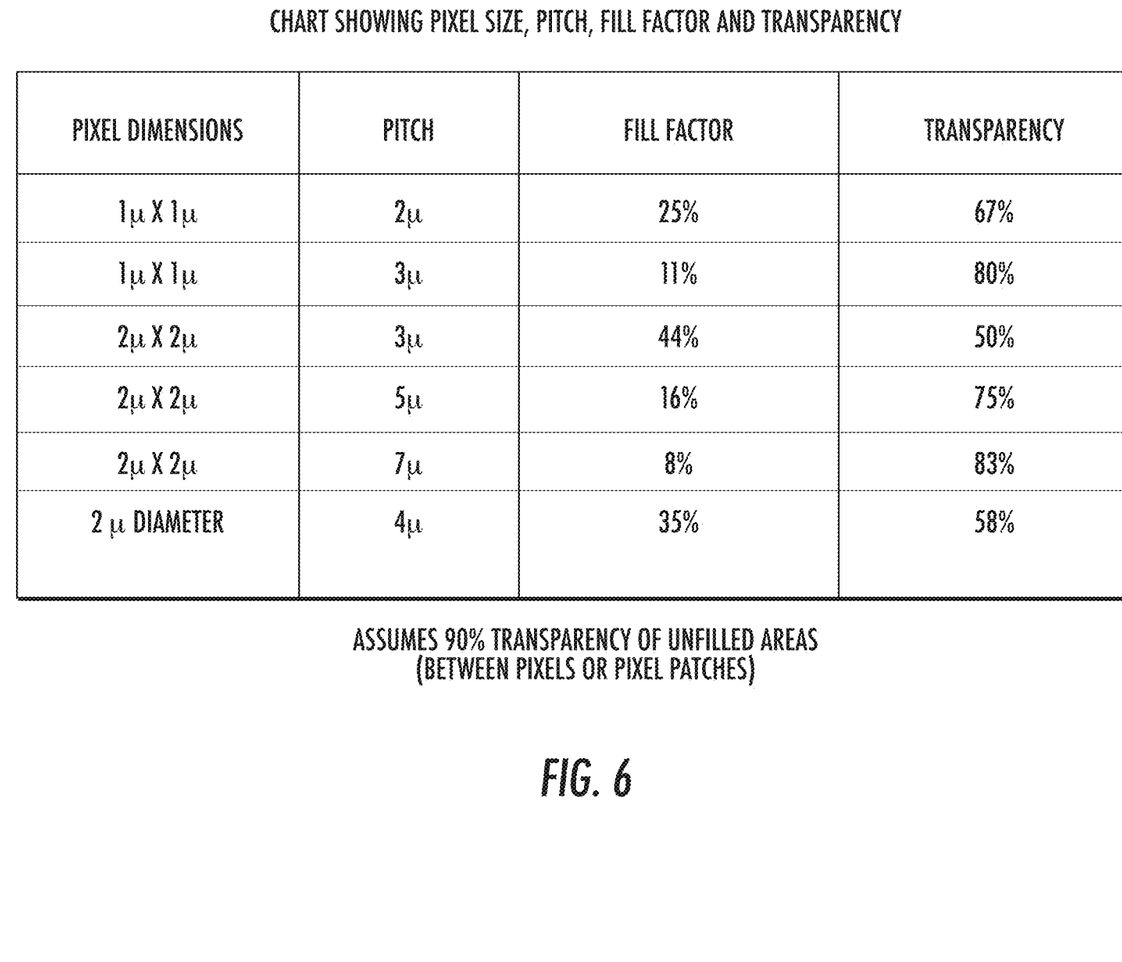
FIG. 6 is a chart showing pixel Size, pitch, fill factor and transparency according to an embodiment.
Figure 7:
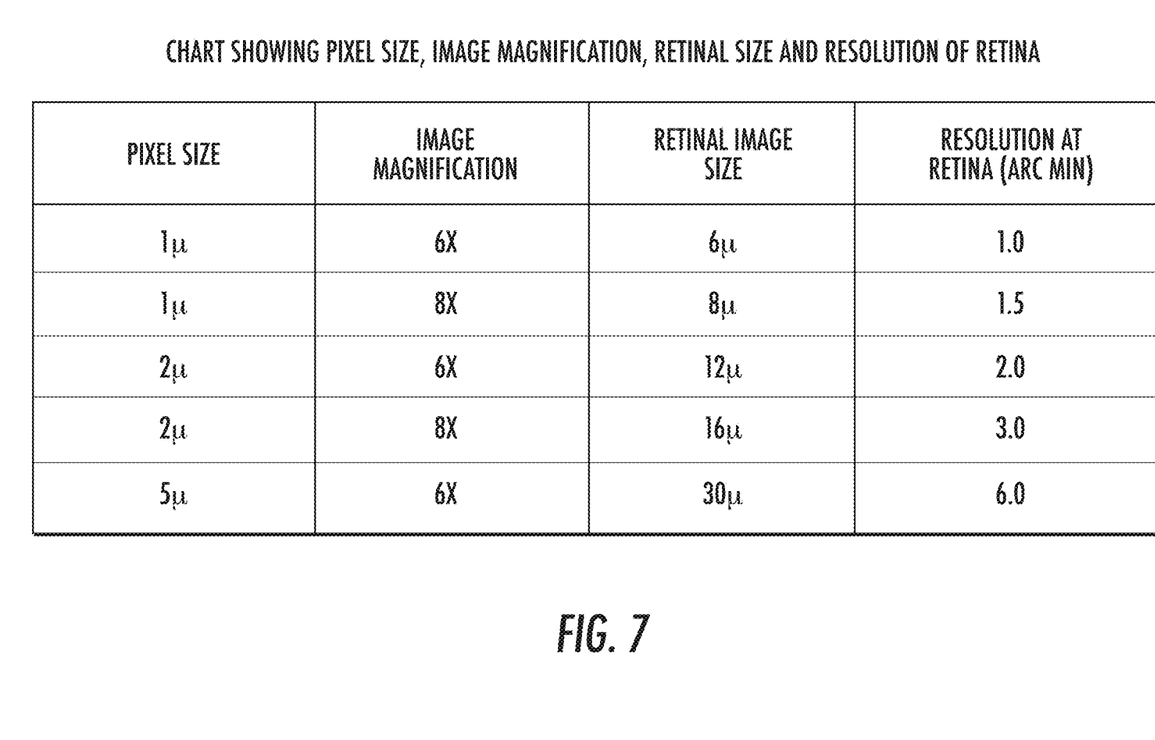
FIG. 7 is a chart showing pixel size, image magnification, retinal size and resolution at retina according to an embodiment.
Figure 8:
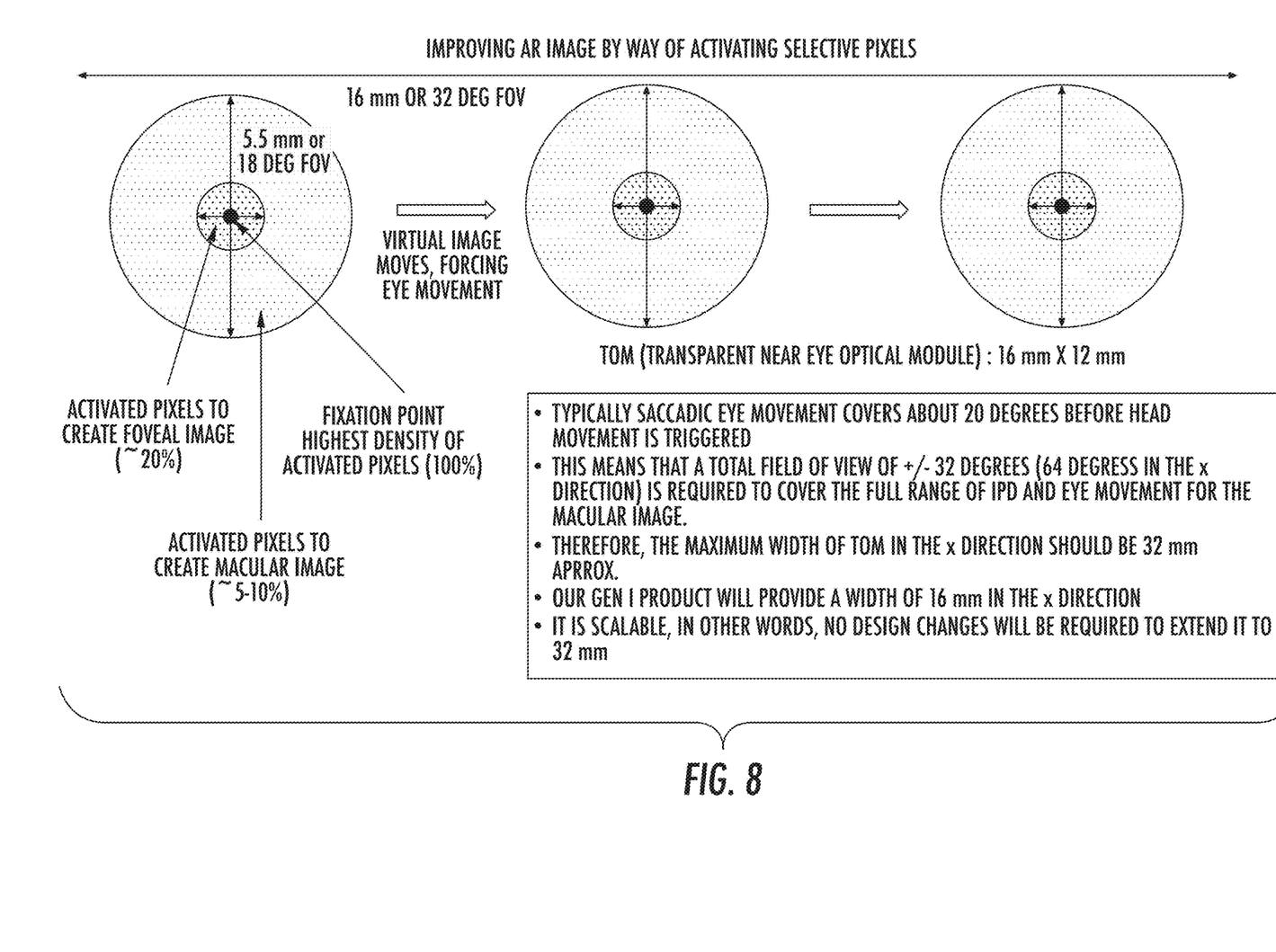
FIG. 8 is a schematic diagram showing improving AR image by way of activating selective pixels according to an embodiment.

In another embodiment, such as shown in FIG. 5, an array of recessed micro-cone structures is formed in the transparent substrate of the display, which are then populated with pixels (by way of example only) iLEDs (micro-LEDs). A metallic coating can be applied to the sides and bottom of the micro-cone structures. By way of example only, aluminum, silver, and/or tin can be used. In aspects, the coating may be optimized to have maximum reflectivity at the wavelength of light emitted by the pixels, for example, green, blue or red. In aspects, the diameter of the cones may be narrowest where the pixel is deposited, which may be the deepest part of the recessed cone(s). The diameter of the cones may be the widest on the surface of the transparent substrate. This embodiment reduces light scatter and causes the light to be projected forward toward the eye of the wearer.

In another embodiment, such as that shown in FIG. 9, an array of transparent pixels may be deposited on a transparent substrate. These transparent pixels can be, by way of example only, transparent iLEDs (micro-LEDs). The AR image can be enhanced by selectively activating a larger number of pixels or pixel patches that provide an image partially or completely covering the fovea of the retina of an eye of a wearer and activating a lower number of pixels or pixels patches that provide an image that partially or completely covers the macula and not that of the fovea of the eye of a wearer.

Any one or more of the following separately or in combination will enhance the function and AR or MR experience of a person looking through the see-through transparent optical module's near eye display. The invention disclosed herein teaches multiple ways of enhancing an AR or MR image. These can be by way of example only one or a combination of the following: 1) Utilizing a larger number of smaller pixels. Thus, for the same level of retinal magnification it is possible to have a higher resolution image created; 2) Utilize aspheric micro-lenses for generating a sharper virtual image; 3) Use a light aperture around a pixel patch or pixel patches to reduce light scatter; 4) Use a light aperture around a micro-lens to reduce light scatter; 5) Have the diameter of the micro-lens slightly larger than the aligned and spaced pixel patches or a single pixel patch to which the micro-lens is in optical communication therewith; 6) Cause as little light loss as possible thereby increasing the amount of light that is projecting towards the eye of the wearer; 7) Utilize multiple pixel patches optically aligned with each individual micro-lens of the plurality of micro-lenses of a micro-lens array; 8) Utilize a curved or faceted architecture for TOM (the sealed transparent optical module that comprises a see-through near eye display and an aligned and spaced micro-lens array)—in aspects, the curved or faceted architecture should, by way of example only, mimic that of the front base curve of the spectacle lens or visor to which TOM is embedded, attached, or aligned, at or near the anterior surface of the eyewear—thus, if the TOM is of a 3-dimensional profile (curved or faceted) then the same may be true of the see-through near eye display and the micro-lens array; 9) Dithering of pixels or pixel patches of the see-though near eye display; 10) Dithering of micro-lenses of the micro-lens array; 11) Removing or turning off specific pixel patch or patches to ensure that overlapping retinal images provide for an image border; 12) keep the magnification of the retinal image at 8X or less; 13) Recessing each pixel or pixel patch within a recessed cone structure located within the surface of the transparent substrate to which the pixel is deposited; 14) Metallizing the recessed cone structure that is located within the surface of the transparent substrate; 15) Increasing the number of active lighted pixels that provide an image that completely or partially fills the fovea of the eye of the wearer while utilizing a lower number of active lighted pixels that provide an image that completely or partially fills the macular area other than that of the fovea, and/or 16) Use smaller micro-lenses, preferably 5-100 microns in diameter, and generate a Bessel beam from the display that travels fully, partially, completely, or mostly diffraction free, at least for short distances—such a Bessel beam can be generated by deploying, for example, switchable polarizing reflectors at the seat of the pixels in the display.

While this invention disclosure teaches embodiments comprising iLEDs (micro-LEDs), it should be pointed out that other light emitting pixels can be used such as, by way of example only, that of OLEDs or TOLEDs. The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. An augmented reality system comprising a see-through near eye display and a microlens array, and further comprising a recessed pixel or pixel patch within a recessed cone structure located within a surface of a partially or completely transparent substrate to which the recessed pixel or pixel patch is deposited, wherein the see-through near eye display comprises a first light emitting pixel (or pixels) and different second light emitting pixel (or pixels), wherein the first light emitting pixel (or pixels) and the different second light emitting pixel (or pixels) are aligned with one or more micro-lenses of the micro-lens array, wherein illuminating the different second light emitting pixel (or pixels) after illuminating the first light emitting pixel (or pixels) of the augmented reality system causes an eye or eyes of a wearer of the augmented reality system to change or adjust a location of fixation along a z-axis, and wherein the z-axis is defined by a point starting at the eye or eyes of the wearer or the see-through near eye display of the augmented reality system and extending to a point or points at a distance in front of the eye or eyes of the wearer or in front of the see-through near eye display of the augmented reality system.

2. An augmented reality system comprising a see-through near eye display and a microlens array, and further comprising a recessed pixel or pixel patch within a recessed cone structure located within a surface of a partially or completely transparent substrate to which the recessed pixel or pixel patch is deposited, wherein the recessed cone structure comprises a metallized coating, wherein the see-through near eye display comprises a first light emitting pixel (or pixels) and different second light emitting pixel (or pixels), wherein the first light emitting pixel (or pixels) and the different second light emitting pixel (or pixels) are aligned with one or more micro-lenses of the micro-lens array, wherein illuminating the different second light emitting pixel (or pixels) after illuminating the first light emitting pixel (or pixels) of the augmented reality system causes an eye or eyes of a wearer of the augmented reality system to change or adjust a location of fixation along a z-axis, and wherein the z-axis is defined by a point starting at the eye or eyes of the wearer or the see-through near eye display of the augmented reality system and extending to a point or points at a distance in front of the eye or eyes of the wearer or in front of the see-through near eye display of the augmented reality system.

3. An augmented reality system comprising a see-through near eye display and a microlens array, wherein the see-through near eye display comprises a first light emitting pixel (or pixels) and different second light emitting pixel (or pixels), wherein the first light emitting pixel (or pixels) and the different second light emitting pixel (or pixels) are aligned with one or more micro-lenses of the micro-lens array, wherein illuminating the different second light emitting pixel (or pixels) after illuminating the first light emitting pixel (or pixels) of the augmented reality system causes an eye or eyes of a wearer of the augmented reality system to change or adjust a location of fixation along a z-axis, wherein the z-axis is defined by a point starting at the eye or eyes of the wearer or the see-through near eye display of the augmented reality system and extending to a point or points at a distance in front of the eye or eyes of the wearer or in front of the see-through near eye display of the augmented reality system, and wherein the augmented reality system is configured to increase a density of the first light emitting pixel (or pixels) and the different second light emitting pixel (or pixels) to provide a virtual image that partially or completely fills a fovea of the eye or eyes of the wearer while utilizing a lower density of the first light emitting pixel (or pixels) and the different second light emitting pixel (or pixels) that provide a virtual image that partially or completely fills a macular area other than that of the fovea.

4. The augmented reality system of claim 3, further comprising a sealed optical module comprising the see-through near eye display and the micro-lens array, wherein the see-through near eye display and the micro-lens array are distance separated from one another and optically aligned, and wherein the see-through near eye display comprises micro-light emitting diodes (iLEDs) or organic light emitting diodes (OLEDs).

5. The augmented reality system of claim 3, wherein the augmented reality system reduces light loss by increasing an amount of light projecting towards the eye or eyes of the wearer.

6. The augmented reality system of claim 3, further comprising a plurality of pixel patches optically aligned with the one or more micro-lenses of the micro-lens array.

7. The augmented reality system of claim 3, wherein the see-through near eye display comprises a curved or faceted architecture, and wherein a see-through near eye display optical module that partially or completely matches a front base curve of a spectacle lens with which the see-through near eye display optical module is aligned and in optical alignment with.

* * * * *